United States Patent [19]

Schmalfuss

[11] Patent Number: 4,727,179

[45] Date of Patent: Feb. 23, 1988

[54] METHOD AND APPARATUS FOR POSITION CONTROL OF PLANT PARTS IN A HIGHLY RADIOACTIVE CELL FOR AN ATOMIC PLANT

[75] Inventor: Harald Schmalfuss, Rodgau, Fed. Rep. of Germany

[73] Assignee: Deutsche Gesellschaft fur Wiederaufarbeitung von Kernbrennstoffen mbH, Hannover, Fed. Rep. of Germany

[21] Appl. No.: 717,308

[22] Filed: Mar. 29, 1985

[30] Foreign Application Priority Data

Mar. 29, 1984 [DE] Fed. Rep. of Germany ....... 3411720

[51] Int. Cl.⁴ .............................................. H04N 7/18
[52] U.S. Cl. ..................................... 358/100; 358/87; 358/107; 358/108; 358/229; 358/903; 376/249
[58] Field of Search ................. 358/100, 107, 87, 248, 358/181, 185, 93, 108, 903, 229, 22; 376/249; 29/400 N; 73/641, 622; 364/512, 521; 228/119; 354/81, 94, 110; 356/2, 373; 250/558

[56] References Cited

U.S. PATENT DOCUMENTS

| | | | |
|---|---|---|---|
| 3,849,596 | 11/1974 | Lawrence | 358/93 |
| 4,158,309 | 6/1979 | Elsner et al. | 73/641 |
| 4,389,669 | 6/1983 | Epstein et al. | 358/107 X |
| 4,526,311 | 7/1985 | Schroder | 376/249 X |
| 4,546,384 | 10/1985 | Kowalski | 358/107 |

FOREIGN PATENT DOCUMENTS

| | | |
|---|---|---|
| 0064342 | 10/1982 | European Pat. Off. . |
| 3236289 | 2/1981 | Fed. Rep. of Germany . |
| 0140731 | 11/1981 | Japan ................. 358/100 |
| 0174790 | 10/1984 | Japan ................. 376/249 |
| 0049296 | 3/1985 | Japan ................. 376/249 |
| 2099255 | 5/1981 | United Kingdom . |
| 2129640 | 10/1982 | United Kingdom . |

OTHER PUBLICATIONS

"Die Technick", H. Heydenreich; 27, Jg., Heft 4, Apr. '72; pp. 267-270.

Primary Examiner—James J. Groody
Assistant Examiner—Victor R. Kostak
Attorney, Agent, or Firm—Paul L. Sjoquist

[57] ABSTRACT

A method and apparatus for locating the position of parts, and identifying changes in parts position over time, within a radioactive cell by utilizing two cameras mounted on a stationary positioning table within the cell, each of the cameras being capable of relative displacement on the table under control of a computer, and each camera having a high resolution objective field smaller than the total desired viewing field. The method is implemented by simultaneously photographing the objective fields of both cameras, displacing one camera a predetermined distance relative to the other camera and repeating the step of simultaneously photographing, and repeating the displacement and simultaneous photographing steps over the entire viewing field; the method steps are repeated at a later time and a comparison is made of the viewing field images reproduced at the two times to identify relative changes in parts position with high resolution.

20 Claims, 1 Drawing Figure

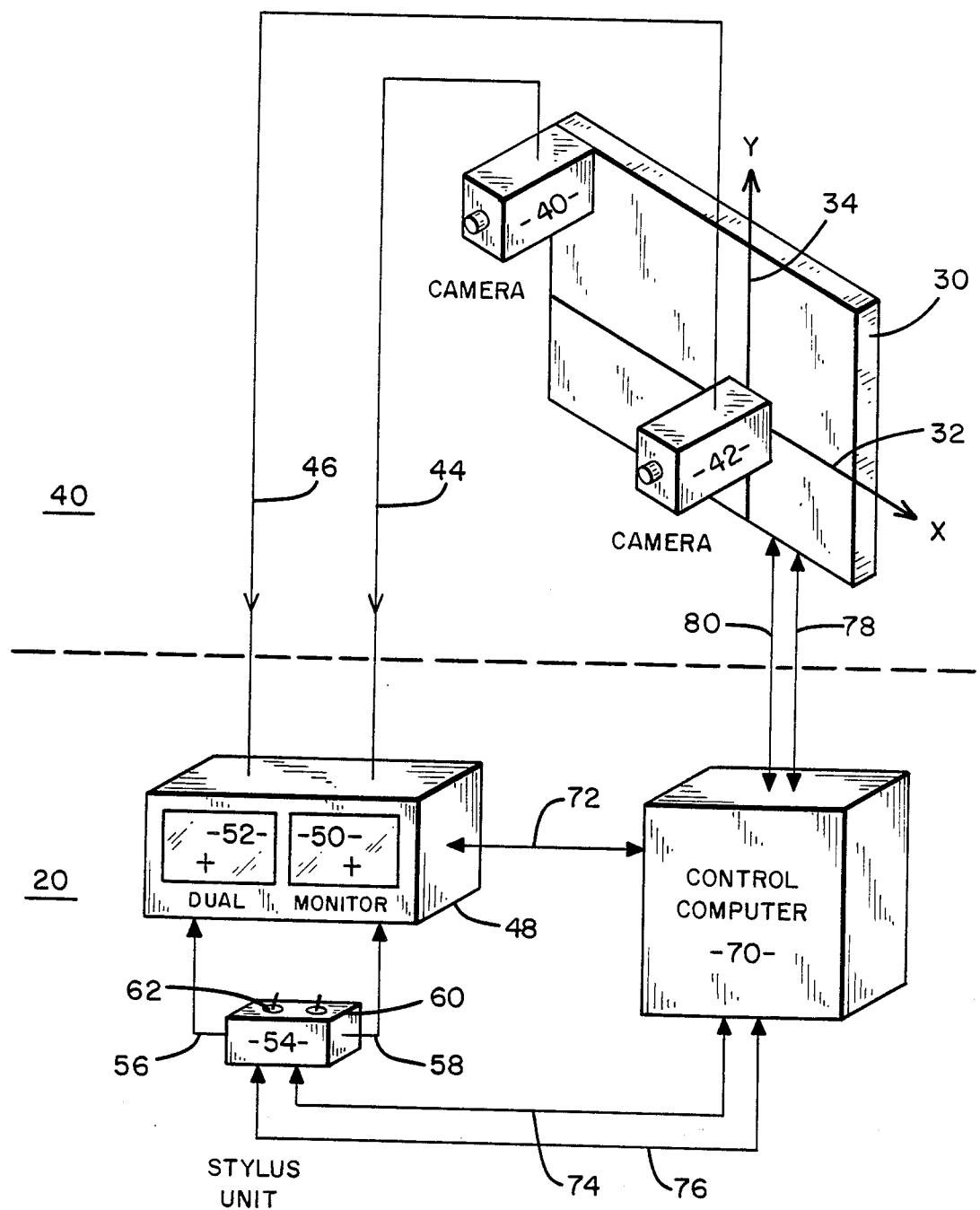

METHOD AND APPARATUS FOR POSITION CONTROL OF PLANT PARTS IN A HIGHLY RADIOACTIVE CELL FOR AN ATOMIC PLANT

BACKGROUND OF THE INVENTION

The invention relates to a method and an apparatus for position control of plant parts located within an objective field, in a shielded, highly radioactive cell of an atomic plant, in particular a large cell of a reprocessing plant for irradiated atomic fuels, hereinafter called hot cell.

These types of position controls serve for measuring changes of position of individual plant parts, in particular changes of position occasioned by aging, relative to a fixed reference system. Envisioned here are time spans of about 25 years or more. These types of systems need not necessarily operate fully automatically. Rather, it is possible here to also make use of interactively executed (between operator and device) procedures and/or apparatus. Essential here, however, is that the procedures (methods) and apparatus be laid out such that a person need not enter the hot cell.

Hot cells in which the reprocessing procedure is running off have, for example, dimensions of 100×25×20 m. If, for example, one sets a measurement accuracy for location determination of the component resulting in the total objective field at 1 mm, this then means that one needs, theoretically, to manage up to 4 billion measurement points. In view of a figure of this type, it can be recognized that high requirements are to be placed on suitable methods and apparatus for position control of the art mentioned. For example, the following conditions must suffice for methods and apparatus for position control suitable for hot cells:

high degree of measurement accuracy and/or resolution capability (e.g. ±1 mm)

large field of measurement and viewing, respectively (100×20 m)

as little as possible storage (memory) requirement long-term reproduceability of the conditions of measurement (capability for comparing data that are far apart in time)

capability of remote operation as little as possible additional expense for hardware in the hot cells as simple as possible operation.

SUMMARY OF THE INVENTION

The invention concerns itself with the problem of developing a method and an apparatus of the initially mentioned species that is adequate inasmuch as possible for the precedingly mentioned requirements.

Relative to the method, this task is resolved by the fact that the objective field is imaged by means of two optical imaging systems disposed spatially displaceable one after the other and in sectional fashion. For doing this, two different sections of the objective field are each imaged in pairs such that, for each paired image, each section of the objective field is displayed by exactly one of the two imaging systems on one display (recording) medium, each one associated with its own imaging system. Furthermore, such that, per paired image, the respective loci of each imaging system as well as at least one picture point per image are detected, that is to say are measured. Then, from the aforementioned measured loci, taking into consideration the imaging scale, the positions of the objective points can be detected and compared with the positions of the objective points detected in the same manner, however at an earlier point in time.

Relative to the apparatus, the foregoing task is resolved by the fact that there are provided at least two optical imaging systems disposed in displaceable fashion relative to one another and capable of being adjusted to the objective field. Here, the viewing field of each imaging system is only the size of one section from the objective field. Moreover, associated to each optical imaging system is a display (recording) medium and/or a displaying arrangement of its own. Moreover, the apparatus in accordance with the invention displays a positioning arrangement that is laid out for the successive changing of the positions of the two imaging systems; additionally there is a first measuring arrangement for detecting the respective positions of the imaging systems and a second measuring arrangement for detecting the position of at least one picture point per image of each section of the objective field. Finally, further provided is an evaluating arrangement in which the positions of the imaging systems determined by means of the measuring arrangement and the respective picture points for determining the positions of the objective points are evaluated.

Accordingly, selected from the plurality of methods and apparatus possible, in themselves, for position control is a system working with optical wavelengths by means of which pictures taken based on the principle of photography are compared with one another. Assured by this is a lesser storage (memory) requirement. The method in accordance with the invention revolves about known principles of photogrammetry, accordingly rests not on absolute but rather on relative coordinates. In this fashion, it is not necessary to pay attention, in comparing photographs separated from one another in time, as to whether the point of reference is of the same required accuracy of measurement in all cases. Accordingly, the invention guarantees a long-term reproduceability of the conditions of measurement, that is to say comparability of data greatly separated by time. The capability of remote control operation is also provided without further ado, since remote control operation of cameras in hot cells is already basically known from the German Offenlegungsschrift* No. 31 38 484 of the applicant—even though for another purpose. Also, the requirement for as simple as possible an operation is met, since absolutely necessary to be disposed inside the hot cell is only the photographing camera, the remainder, however, capable of being disposed externally, and for this reason already a comparatively easy operability is provided. Additionally is the fact that detection by measurement instrumentation of respective positions of the picture points and of the imaging systems is likewise possible today with the simplest of means.

*Offenlegungsschrift=laid open print, published patent application (specification) examined only as to obvious defects but not as to patentability.

By use of two spatially displaceable, separate imaging systems in accordance with the invention with display media associated to each, also assured with simple means is a high resolution capability with a simultaneously large field of measurement. Capable of being used as imaging systems in this case are usual type, standard television cameras. These types of standard television cameras do indeed have the disadvantage of having a maximal resolution of 500×700 points, with the consequence that one, in the case of a required resolution of 1 mm per picture point, can count only upon an objective field of about 500×700 mm with one photograph. Now, since in the case of relative measuring, at least two loci of measurement must lie in the same picture, otherwise greatly separated points of measurement would have to be detected, one does not generally make out with such a small objective field, respectively with such a small field of measurement or viewing field. Desirable would be an enlargement of the viewing field by a factor of 10. Standard imaging systems with a picture point count of 5000×7000 are, however, at least at the present time, not capable of being produced from economically reasonable points of view. Now, this problem has been resolved by the aforementioned application of the two imaging systems disposed spatially displaceable, in particular relative to one another. By this means, it is possible also to simultaneously detect points of measurement within the objective field that are far apart without, hereby, the scale of imaging, and therewith the resolution capability, having to be worsened. With the two imaging systems, simulated, with a high degree of resolution, is an almost momentary photographing of an oversized imaging system, due to the fact that the objective field is imaged, pair-wise, one after the other, in sections of systems with lesser resolution capabilities.

Particularly simple imaging conditions are achieved by the fact that the two imaging systems are moved only within one plane, in particular then if one reduces the objective field to an essentially flat field of observation, which is as a rule possible in the case of hot cells.

By use of a control computer, position control in accordance with the invention can be carried out to a great extent automatically, with an interactive intervention on the part of an operator being required only in the case of marking desired picture points. A control computer of this type also adapts itself to a great measure for a self-actuated comparison of the coordinates of the objective points determined in accordance with the invention at points in time different from one another.

It is basically possible to support both imaging systems on a common clamping arrangement in fixed fashion and to displace this clamping arrangement as a whole for successive, pair-wise scanning of the objective field. Preferentially, however, only one imaging system is supported in fixed (stationary) fashion so that only the other imaging system(s) need to be moved. This has the further advantage that only the position of the one or the other imaging system(s) needs to be measured per photograph.

For rapid processing of data and simple operability of the arrangement, the imaging systems are preferentially constructed based on the principle of the television camera. The same applies for the display (recording) contrivances, which are constructed based on the principle of television picture screens, for example Braun tubes (cathode ray tubes).

Preferentially, the position control in accordance with the invention makes use of only two imaging systems and a corresponding number of display arrangements. By this means, expense for equipment is reduced to a minimum and, indeed, also relative to use of only one overdimensioned imaging system with comparable resolution capabilities. However, capable of also basically being used are three and more imaging systems with a corresponding number of display media. By this means, resolution capability can be correspondingly increased.

BRIEF DESCRIPTION OF THE DRAWING

FIG. 1 is a diagrammatic view of the invention.

DESCRIPTION OF THE PREFERRED EMBODIMENTS

The invention will be explained in more detail in the following with the aid of the example of embodiment, with reference to the strongly schematic, sketched illustration thereof in the accompanying FIGURE.

In the case of the example of embodiment illustrated in the FIGURE, disposed in stationary fashion inside the hot cell 10 is a flat, mechanical positioning table 30.

Disposed (likewise) in stationary fashion on the positioning table 30 is a first semiconductor camera 40 and, in displaceable fashion, a second semiconductor camera 42. For displacing the second semiconductor camera 42, the positioning table 30 displays guiderails 32 and 34 that are aligned orthogonally to one another. The FIGURE illustrated shows only two of these types of guiderails. Basically, however, several of these types of guiderails can also be provided. Also, it is not absolutely necessary that these be orthogonal to one another.

The two semiconductor cameras 40 and 42 serve the purpose of being able to determine changes of position of individual plant (system) parts. For this purpose, the two semiconductor cameras 40 and 42 and/or the mechanical positioning table 30 are disposed at a suitable distance from the plant parts to be monitored. The totality of plant parts to be monitored will hereinafter be called the objective field.

As already stated in the introduction, the viewing field of each semiconductor camera 40 and 42, respectively, is only large enough to be able merely to detect one section from the objective field. Quasi-simulated by the relative displaceability of the two semiconductor cameras 40 and 42 relative to one another is an observation camera that can detect the entire objective field and, hereby, displays the resolution capability of the two individual semiconductor cameras actually used. The high resolution capability of this simulated "giant camera" is obtained by the fact that the entire objective field is imaged not only with a single photograph but rather with several photographs made one after the other in pairs.

Experiments by the applicant have yielded that, for example, coming into consideration as semiconductor cameras are the camera of the SONY company, which weighs only 150 g, measuring 44×29×67 mm and, in spite of this, offers a resolution of 380×490 picture points. Here, the picture point size on the CCD-chip amounts to 0.023×0.013 mm. The result of this is that the accuracy of positioning of the two semiconductor cameras 40 and 42 on the positioning table 30 must be precise, relative to one another, to about 0.010 mm—if one does not wish to again destroy the high picture point resolution through mechanical inaccuracies. These types of mechanical positioning accuracies, however, are today capable of being achieved without further ado, for example due to the fact that the second camera 42 can be moved within the guiderails 32 or 34 by a mechanical fine-drive that is not shown.

The signal outputs of the two semiconductor cameras 40 and 42 are connected, over signal lines 44 and 46, with the control inputs of a dual monitor 48. The dual monitor 48 consists of a first monitor 50, which is connected on the input side with the signal output of the first semiconductor camera 40, and a second monitor 52 that is associated in corresponding fashion with the second semiconductor camera 42. The section of objective field photographed by the first semiconductor camera 40 is accordingly imaged on the first monitor 50, the section of objective field photographed by the second semiconductor camera 42 on the second monitor 52. The dual monitor 48 is connected, via two signal lines 56 and 58, with a light stylus unit and/or joystick 54. In particular here, a first light stylus 60 is connected with the first monitor 50 and a second light stylus 62 with the second monitor 52. The light styluses serve, in manner known per se, for the purpose of marking points on the monitor and to determine the position of these points on the picture screen.

The control inputs of the fine-drive—not shown in the FIGURE—for the X-Y displacement of the second semiconductor camera 42, of the dual monitor 48 and the light stylus unit 54 are connected, in data-flow fashion, with a control computer 70 via data flow/signal lines 72, 74, 76, 78 and 80. The control computer in this fashion receives, on the one hand, the relative positions of the two semiconductor cameras 40 and 42 (for the first semiconductor camera 40, the position is constant) and the positions of the two measurement points each marked by the light stylus unit 54 on the two monitors 50 and 52. Since each imaging scale is also stored in the control computer 70—in the example of embodiment illustrated, the scale is constant—the actual locus of the objective point associated to each marked picture point and, therewith, the intervals of the objective points from one another can be computed by means of simple, geometric/optical calculations from the aforementioned data. For this purpose, one makes use of the known process from photogrammetry.

On the whole, position control with the illustrated apparatus is carried out as follows. The two semiconductor cameras 40 and 42 are positioned such that each camera (with known imaging scale) has a measurement location, that is to say a point of the objective field, "in the viewer". The operator located in an outside room 20 now enters at the first monitor 50, with the first light stylus 60, the position of the place of measurement viewed by the first semiconductor camera 40 and at the second monitor 52, with the second light stylus 62, the position of the place of measurement viewed by the second semiconductor camera 42. Additionally, stored in the computer 70 is a measurement location number firmly associated to each place of measurement, for example for the first two places of measurement the measurement place numbers A and B; moreover, each of the positions of the semiconductor camera 40 and 42 associated to the pictures with the places of measurement A and B on the positioning table 30. The control computer then determines from the coordinates a vector that points from location A toward B. Therefore, for each measurement procedure, the three space coordinates associated to each place of measurement, hence in this case the coordinates aaa and bbb, the connecting vector AB and the applicable imaging scale are stored. Next, positions B and C of the two cameras are "viewed" and handled in the same fashion. In this fashion, the entire objective field is recorded. As a result, one obtains a vector field that is independent of the position of the two cameras. The determination of these types of vector fields is known per se from photogrammetry—not, however, the successive recording of an objective field by pair-wise photographing, in turn, of second sections of the objective field. Let be pointed out here that the photographing technique illustrated has nothing to do with the imaging technique of stereophotogrammetry—likewise known from photogrammetry.

In the case of a repeated measurement, one proceeds exactly as described above and then compares the vector fields with one another. Local changes, that is to say relative location displacements of the individual plant parts within a hot cell are easily capable of automatically being recognized by this type of vector field comparison. A vector field comparison of this type is preferentially carried out by the already-mentioned control computer 70. Additionally, if completely global changes, for example displacements of the entire hot cell, are also to be recognized, one would have to also co-store an absolute reference point.

I claim:

1. Apparatus for position control of the plant parts located within an objective field in a shielded, highly radioactive cell of an atomic plant, in particular a large cell of a reprocessing plant for irradiated atomic fuels, hereinafter called hot cell, comprising
   (a) at least two optical imaging systems (40, 42) disposed in displaceable fashion to one another and capable of being adjusted to the objective field, whereby
       the viewing field of each imaging system (40, 42) is only of the size of one section from the objective field and each imaging system (40, 42) is associated to its own display arrangement (50, 52),
   (b) a positioning arrangement (30, 32, 34, 70) that is laid out for successively changing the position of the imaging systems (40, 42),
   (c) a first measuring arrangement for detecting each of the positions of the imaging systems (40, 42),
   (d) a second measuring arrangement (54) for recording the position of at least one picture point per picture of each section of the objective field and
   (e) an evaluation arrangement (70) for the common processing of the positions of the imaging systems (40, 42) and picture points recorded per picture, and subsequent determinations of the positions of the points of the objective.

2. Apparatus according to claim 1, wherein the evaluation arrangement (70) further comprises a comparison arrangement for an automatic comparison of the positions of the points of the objective field determined at different points in time.

3. Apparatus according to claim 1 or 2, wherein the imaging system (40) is clamped in stationary fashion.

4. Apparatus according to claim 1 wherein the imaging systems are clamped in a relative displaceable fashion to one another in one plane.

5. Apparatus according to claim 1 wherein the imaging systems (40, 42) are disposed on a common clamping arrangement (30).

6. Apparatus according to claim 1 wherein each imaging system (40, 42) is structured based on the principle of a television camera and the display arrangements (50, 52) are constructed based on the principle of a television picture screen.

7. Apparatus according to claim 1 wherein the second measuring arrangement includes a light stylus (60, 62).

8. Apparatus according to claim 1 wherein the evaluation arrangement (70) further comprises a control computer connected with outputs of the first and second measuring arrangement (60, 62).

9. A method of monitoring the position of parts within a viewing field in a radioactive cell, and identifying changes in parts position at a subsequent time by repeating the monitoring steps and comparing the viewing fields so obtained, comprising the steps of
 (a) obtaining a first image of the viewing field by two spatially displaced optical imaging systems, each system having a high resolution objective field smaller than the viewing field, wherein the image is obtained by
  (i) simultaneously obtaining two objective field images from the two systems,
  (ii) displacing one system relative to the other by a predetermined distance,
  (iii) simultaneously obtaining two further objective field images, and
  (iv) repeating the steps (i–iii) until objective field image pairs have been obtained over the entire viewing field, and
  (v) forming the image of the viewing field by measuring the displacement of respective objective field image pairs over the entire viewing field;
 (b) obtaining a second image of the viewing field at a subsequent time, by repeating steps (a), and comparing the second image to the first image to identify changes in part position.

10. The method of claim 9, wherein the imaging systems are movable within a common plane.

11. The method of claim 9 or 10, wherein the viewing field is an essentially flat field.

12. The method of claim 9, wherein the imaging systems include cameras.

13. The method of claim 9, further comprising the steps of displaying on a visual display the pairs of objective field images, as they are obtained.

14. An apparatus for monitoring the positions of objects within a visual field, comprising
 a plurality of movable optical imaging devices,
 said optical imaging devices spatially displaced to image the visual field in sections,
 said visual field sections being imaged in pairs by separate ones of said optical imaging devices,
 said visual field section pairs containing a reference locus,
 a recording medium for recording the visual field sections and respective positions of the optical imaging devices,
 an evaluation device for comparing the recorded visual field sections and the positions of the optical imaging devices with a second set of imaged visual field sections and positions of the optical imaging devices.

15. The apparatus of claim 14, wherein the evaluation device compares the reference loci of the first and second set of the imaged visual field sections.

16. The apparatus of claim 14, wherein the imaging devices are movable within a common plane.

17. The apparatus of claim 16, wherein one imaging device is stationary.

18. The apparatus of claim 14, wherein the imaging devices are in a fixed position relative to each other.

19. The apparatus of claim 14, further comprising display terminals connected to receive visual field sections from the imaging devices.

20. The apparatus of claim 14, wherein the imaging devices are cameras.

* * * * *